United States Patent [19]

Lee

[11] Patent Number: 5,370,191
[45] Date of Patent: Dec. 6, 1994

[54] SEMI-AUTOMATIC, ADJUSTABLE PICKING AND WEEDING IMPLEMENT

[76] Inventor: Chih-chiang Lee, 436 Windflower La., Placentia, Calif. 92670

[21] Appl. No.: 20,287

[22] Filed: Feb. 19, 1993

[51] Int. Cl.⁵ .................................................. A01B 1/16
[52] U.S. Cl. ................................ 172/378; 172/371; 294/50.9
[58] Field of Search ............ 172/378, 371; 294/50.8, 294/50.9

[56] References Cited

U.S. PATENT DOCUMENTS

| | | | |
|---|---|---|---|
| 759,393 | 5/1904 | Otto | 172/378 X |
| 872,260 | 11/1907 | Shank | 294/50.9 |
| 938,759 | 11/1909 | Greene | 294/50.9 |
| 1,276,017 | 8/1918 | Beymer | 172/378 X |
| 2,064,448 | 12/1936 | Rieff | 172/378 X |
| 3,268,255 | 8/1966 | Bennett | 294/50.9 |
| 3,608,644 | 9/1971 | Ambrose | 172/378 |

Primary Examiner—Randolph A. Reese
Assistant Examiner—Christopher J. Novosad

[57] ABSTRACT

A semi-automatic, adjustable picking and weeding implement comprises a stationary prong and an adjustable prong with which a horizontal handle, a stop pad, a spring, two horizontal, partly-threaded shafts, two stop pegs and four nuts are associated so that the implement can be vertically pushed into soil, and one prong can be slantingly pressed toward the other to pluck up weeds easily and promptly. After that, the prong that is slantingly pressed can automatically recover its vertical position. In order to weed various sizes of weeds, the span between the stationary prong and the adjustable prong can be modified. Essential methods for using such an implement are also disclosed.

10 Claims, 6 Drawing Sheets

SEMI-AUTOMATIC, ADJUSTABLE PICKING AND WEEDING IMPLEMENT

BACKGROUND OF THE INVENTION

1. Field of the Invention

This invention relates to a picking and weeding implement for the removal of plants, and especially weeds such as dandelion, daisy from soil in, for example, grass lawns, yards, parks, golf courses or agricultural fields.

2. Description of the Prior Art

Conventionally, weeding or picking has been performed by non-specialised tools such as spades, rakes, hoes, forks or trowels. The weakness of these conventional tools is that they often leave a large hole when used to remove a plant from the soil. The size of this hole is particularly problematic when weeds are found in grassed areas such as lawns, as the hole scars the lawn and spoils its appearance. This is one of the main reasons why weedkillers are used, despite their toxicity to humans and animals.

SUMMARY OF THE INVENTION

The principal object of this invention is to provide a weeding implement, and a method of using such an implement, which minimises the disturbance of soil necessary to remove a weed or plant growing threrin. This minimises the size of the resulting hole in the soil, and makes the weeding process easier, less tiring, quicker and generally more efficient. By doing so, the use of weedkillers is discouraged. Further, the use of the implement of this invention provides exercise and recreation denied to those who rely upon weedkillers.

GENERAL DESCRIPTION OF THE PREFERRED EMBODIMENTS

With this object in view, the picking and weeding implement of this invention comprises a horizontal handle made of plastics or wood in which a stationary prong and a stop pad are installed, juxtapositional to each other. Beneath the stop pad an adjustable prong, parallel to the stationary prong, is fixed.

The stop pad is used to make the adjustable prong stay at a proper height when the prong is operated.

In order to make the adjustable prong steady and workable, a flat supporting bar is parallelly installed between the upper sections of these two prongs.

Through six holes opened in the upper sections of the stationary prong and the adjustable prong as well as the flat supporting bar, each member having two holes, two horizontal, partly-threaded shafts are made to go so that the adjustable prong can be properly operated with the help of two stop pegs that are placed at the unthreaded ends of the two horizontal, partly-threaded shafts. These two stop pegs share the work of joining the adjustable prong to the two horizontal, partly-threaded shafts with the help-of two holes opened in the upper section of the adjustable prong.

In order to make the adjustable prong semi-automatic, a spring that has pressing power is fixed between the stationary prong and the adjustable prong so that the latter can automatically recover its vertical position after it is pressed against the stationary prong and released.

Furthermore, in order to adapt the implement to various sizes of weeds, four nuts are placed around the threaded parts of the two horizontal, partly-threaded shafts so that they can be turned backwards and forwards and result in narrowing or widening the span between the stationary prong and the adjustable prong; that is, when the nuts are turned backwards, the span will become wider and when the nuts are turned forwards, the span will become narrower.

In order to enable the two stop pegs to be properly installed and enable the four nuts to be easily operated, the upper sections of the stationary prong and the adjustable prong are made flat, while the middle sections and lower sections of these two prongs are made semi-circular, approximately between 90 and 150 degrees of a circle, so that they can suit the roots of weeds that are generally round.

The above-mentioned two prongs are not made equal in length and, indeed, it is preferred that the stationary prong is longer than the adjustable one. The former may be 5 mm to 10 mm longer. It is preferred that the shorter prong has two barbs at its end in order to properly catch the comparatively or considerably thick part of the root instead of the thinnest part.

The invention encompasses methods of picking and weeding weeds or plants by pushing two pronged parts endways into soil around a weed or plant, gripping the roots of the weed or plant by pressing tightly with one hand an adjustable prong against a stationary one, and drawing up the implement along with the plucked weed or plant. After the weed or plant is released from the prongs, the adjustable prong will recover its vertical position automatically under pressure of a spring that is fixed between the stationary prong and the adjustable prong. As the process of having weeds or plants removed one after another from the earth partly by pressing the adjustable prong with one hand and partly by means of the pressing strength of the spring, this characteristic feature in function is accordingly regarded as semi-automatic.

Another method comprises adjusting the span between the stationary prong and the adjustable prong in order to make the implement able to pick and weed various sizes of weeds at the least disturbance of the soil. This adjustment is done by means of turning backwards and forwards four nuts which are installed around the threaded parts of two horizontal, partly-threaded shafts. Accordingly, when the nuts are moved backwards, the span between these two prongs will widen up, and when the nuts are moved forwards, the span will narrow down. However, the span cannot be adjusted to such a degree as to pick up the thinnest roots of weeds.

In order to pluck weeds with great speed, the grass lawn or yard to be engaged therein, for example, should be properly watered prior to operation.

BRIEF DESCRIPTION OF THE DRAWINGS

In order that this invention may be more readily understood, reference will now be made, by way of example only, to the accompanying drawings in which.

EMBODIMENT OF FIG. 1

Figure 1:
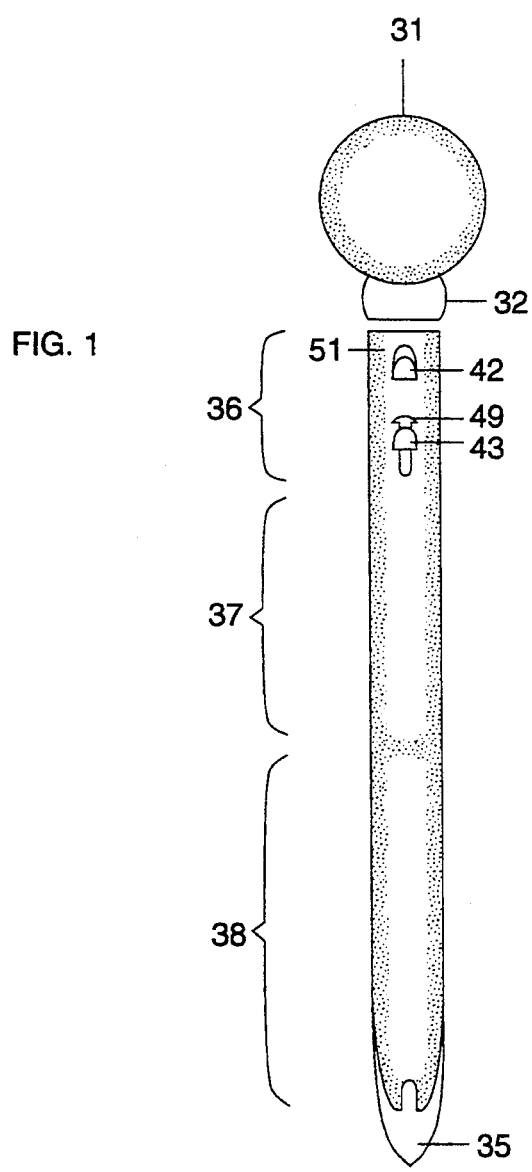
FIG. 1 represents a front elevational view showing the relative lengths of the stationary prong and the adjustable prong.

Referring to FIG. 1 of the drawings, this is a front view of the implement that comprises a handle 31 in which a stop pad 32 is installed and beneath which an adjustable prong, as represented by 36, 37 and 38, is fixed, 35 representing the lower section of a stationary prong. Through two holes made in the upper section of the adjustable prong there go two ends of two horizontal, partly-threaded shafts 42 and 43. 51 is one of these two holes the height of which is a little higher than that of the unthreaded end of the horizontal, partly-threaded shaft. This is so made that the adjustable prong can be slantingly pressed. 36 represents the upper section of the adjustable prong which is made flat; 37 and 38 represent the middle section and lower section of the adjustable prong which are made semi-circular, approximately between 90 and 150 degrees of a circle. In addition, the middle section 34 (hidden behind) and the lower section 35 of the stationary prong are also made in the same way. 38 represents the lower section of the adjustable prong which can easily pick up roots of weeds with the help of two barbs situated at its end on the other side.

Other embodiments related with one another can be understood after examining Figures that follow.

EMBODIMENT OF FIG. 2

Figure 2:
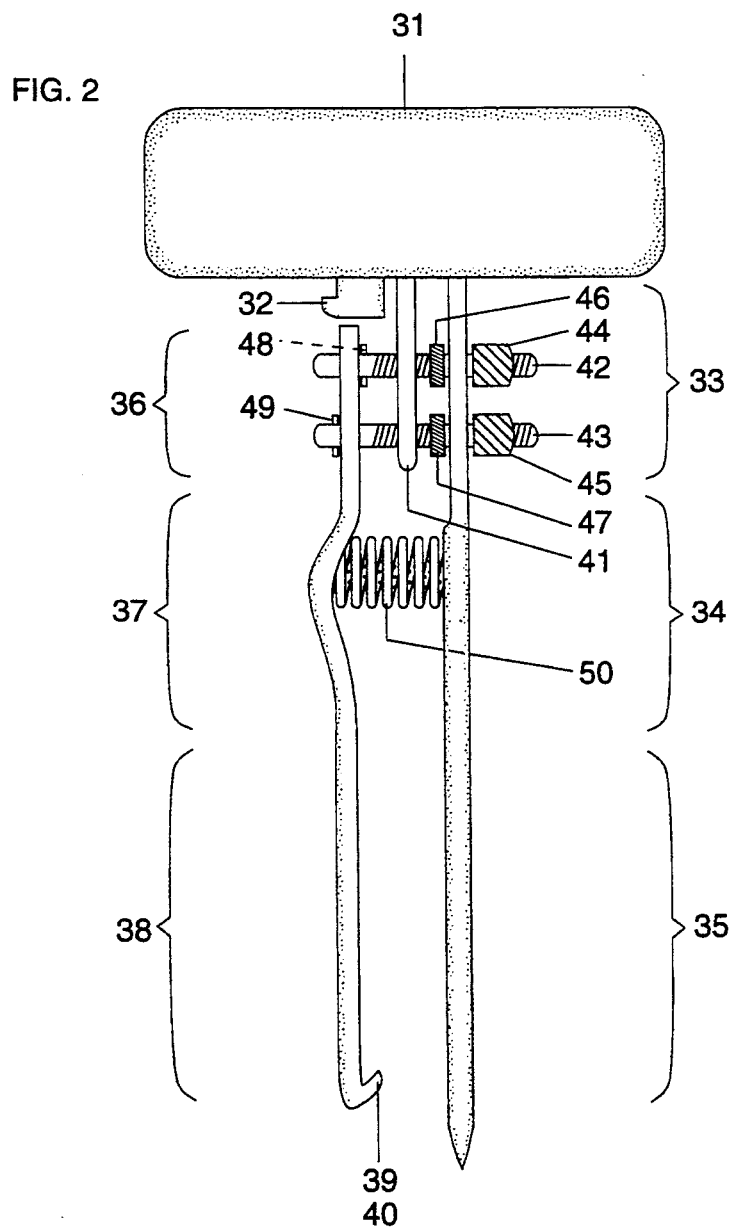
FIG. 2 represents a side elevational view of the implement showing all the component parts of the implement.

Referring now to FIG. 2, 31 represents the handle. 32 is a stop pad which stops the adjustable prong at a proper height when operated. 33 is the upper section of the stationary prong; 34 the middle section; and 35 the lower section against which the lower section of the adjustable prong 38 can be slantingly pressed with one hand of the user. 42 and 43 represent two horizontal, partly-threaded shafts, the right ends of which are threaded and the left ends of which are not threaded.

Furthermore, the upper parts, or the tops, of the unthreaded parts of the two horizontal, partly-threaded shafts are made round in order to make the adjustable prong able to be operated easily, while the lower parts, or the bottoms, of them are made square so that either of the unthreaded ends of these two shafts will not rotate when one of four nuts 44, 45 and 46, 47 is turned backwards and forwards around the threaded parts of these two shafts. This design can be understood after examining FIG. 4 in which two holes 51 and 52, the tops of which are made round and the bottoms of which are made square in order to fit said two unthreaded ends of these two shafts.

The adjustment of the span between the stationary prong and the adjustable prong is fulfilled by turning the four nuts 44, 46 and 45, 47. When they are turned forwards, the span between said two prongs will become narrower, and when they are turned backwards, the span between them will become wider.

41 represents the flat supporting bar through two holes in which said two horizontal shafts go.

48 and 49 are two stop pegs. The upper one, on the right side of the upper section 36 of the adjustable prong, goes through the unthreaded part of the upper horizontal shaft 42. The lower one, on the left side, goes through the unthreaded part of the lower horizontal shaft 43.

37 represents the middle section of the adjustable prong. The protrusive and sloping structure is designed for a hold of it as well as a pressing of one hand. 38 represents the lower section of the adjustable prong the end of which is double-barbed, as represented by 39 and 40, 39 being hidden behind, which, however, can be seen in FIG. 5.

50 represents a spring fixed between the stationary prong and the adjustable prong. Through the elastic power of this agent, the adjustable prong will automatically recover its vertical position after having it pressed against the stationary prong during operation.

EMBODIMENT OF FIG. 3 THROUGH FIG. 6

Figure 3:
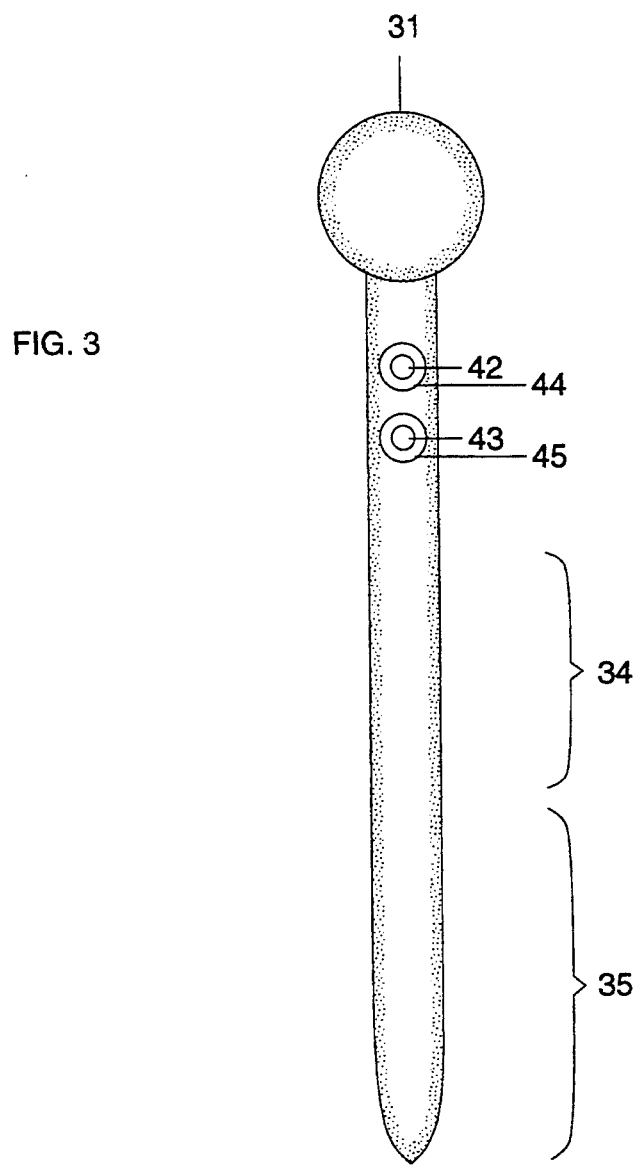
FIG. 3 is a rear elevational view of the implement showing the stationary prong and the component parts installed therein.

Referring now to FIG. 3 of the drawings, 42 and 43 represent two horizontal, partly-threaded shafts looked on from the rear; 44 and 45 are two nuts. 35 represents the lower section of the stationary prong whose pointed end is made in a triangular shape so that it can be pushed into soil easily.

Figure 4:
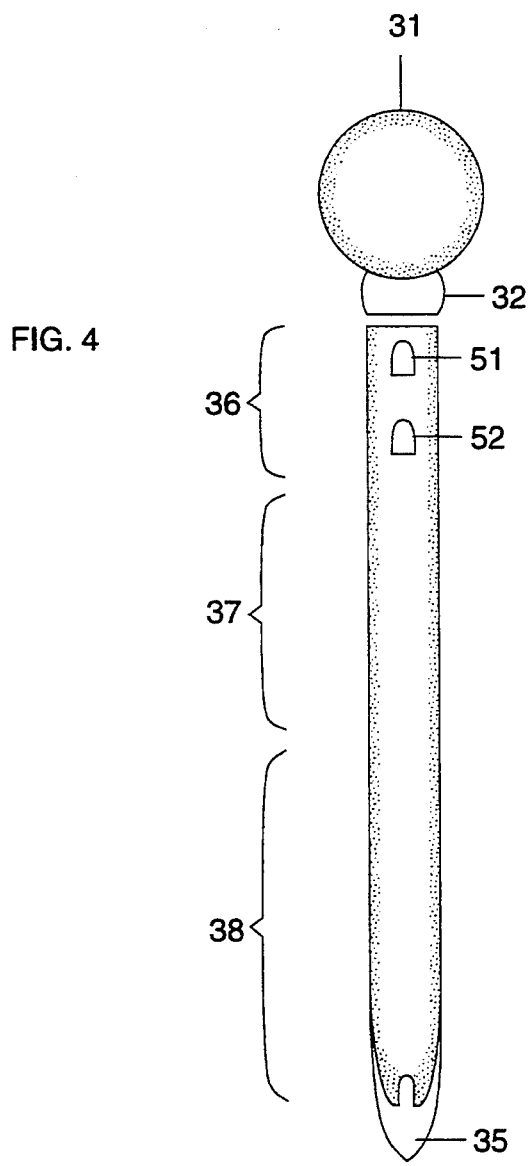
FIG. 4 also represents a front elevational view showing two holes, through which the unthreaded ends of two horizontal, partly-threaded shafts will go, the upper part of which is made round while the lower part of which is made square.

As shown in FIG. 4, 51 and 52 are two holes through which the unthreaded ends of two horizontal, partly-threaded shafts will go. As the lower part, or the bottom, of the unthreaded part of the shaft is square, the bottom of the hole is accordingly made square so that the whole shaft will not turn around when a nut around it is turned for an adjustment. The reason why the holes are made higher than the height of the horizontal shafts 42 and 43 is that when the implement is operated, the adjustable prong must be slantingly pressed toward the stationary prong. This slanting must occupy more room than when the adjustable prong stays undisturbed.

Figure 5:
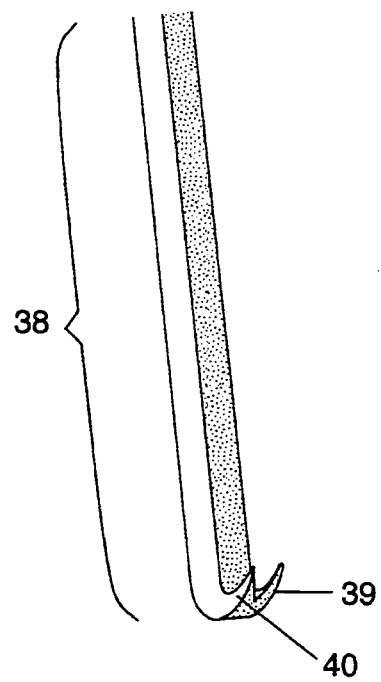
FIG. 5 represents an elevational view of the lower section of the adjustable prong to an enlarged scale showing two barbs situated at the end of the adjustable prong.

Referring now to FIG. 5, which is an enlarged Figure, 38 represents the lower section of the adjustable prong at the end of which two barbs 39 and 40 are situated. The upward degree is approximately between 30 and 40 degrees. These barbs are used to catch the roots of weeds, especially thicker ones.

Figure 6:
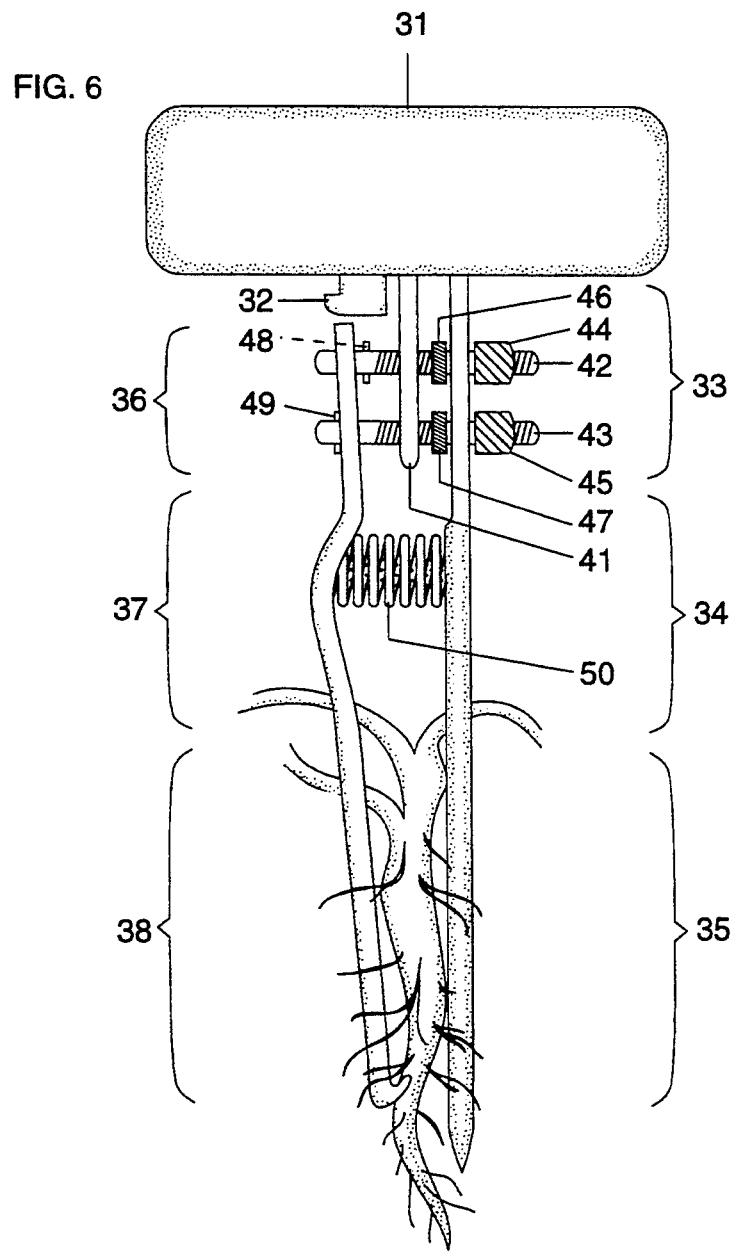
FIG. 6 is a side elevational view showing the root of a weed is already picked up after the adjustable prong is pressed against the stationary prong with one hand (the hand is not depicted here so that the relative positions of these two prongs and the picked weed can be clearly seen).

FIG. 6 mainly describes how the root of a dandelion, for example, is caught by said two prongs and said two barbs when the adjustable prong is pressed against the stationary prong with one hand. In order to have the relative positions of said two prongs and the caught root clearly depicted, the hand that is tightly holding the implement is missing here.

What has been described above only represents a small number of examples. Operative methods in detail could not be fully dealt with here.

What I claim is:

1. A picking and weeding implement comprising:
a stationary prong;
an adjustable prong juxtapositional to said stationary prong in order to cooperate therewith to be pushed endways into soil to remove weeds, and having at a free end thereof two barbs facing generally toward said stationary prong;
a supporting bar parallelly interposed between upper sections of said prongs; a stop pad; said upper section of said adjustable prong is provided with two holes each having a size;

two horizontal partly threaded shafts each provided with a stop peg and coupled to said prongs wherein unthreaded ends of said shafts each have a diameter smaller than said size of each of said holes.

2. A picking and weeding implement according to claim 1, wherein the upper sections of said prongs are flat, while middle sections and lower sections of said two prongs are semi-circular, approximately between 90 and 150 degrees of a circle.

3. A picking and weeding implement according to claim 1, wherein the adjustable prong is placed beneath the stop pad in order to make the adjustable prong stay at a suitable height when operated.

4. A picking and weeding implement according to claim 1, wherein the stationary prong is made longer than the adjustable prong in order to let said two barbs generally catch a comparatively or considerably thick part of a root of a weed.

5. A picking and weeding implement according to claim 1, wherein the upper sections of the stationary prong and the adjustable prong as well as the flat supporting bar that is parallelly fixed between said two prongs, are all penetrated, through six holes respectively opened therein, each member having two holes, by said to horizontal, partly-threaded shafts so that the adjustable prong can be made steady and workable, with the help of said two stop pegs, and slantingly operated.

6. A picking and weeding implement according to claim 1, wherein the spring is installed between middle sections of the stationary prong and the adjustable prong so that after a user presses the adjustable prong slantingly against the stationary prong and releases it, the adjustable prong will automatically recover its vertical position.

7. A picking and weeding implement comprising:
a stationary prong;
an adjustable prong shorter than said stationary prong, juxtapositional to said stationary prong in order to cooperate therewith to be pushed endways into soil to remove weeds, and having at a free end thereof two barbs;
a supporting bar parallelly interposed between upper sections of said prongs; a stop pad; said upper section of said adjustable prong is provided with two holes each having a size;
two horizontal partly threaded shafts each provided with a stop peg and coupled to said prongs wherein unthreaded ends of said shafts each have a diameter smaller than said size of each of said holes;
a spring mounted between said stationary prong and said adjustable prong; and
four movable nuts placed around threaded parts of said horizontal partly-threaded shafts.

8. A method of picking and weeding comprising steps of:
providing a stationary prong;
providing an adjustable prong which is juxtapositional to said stationary prong in order to cooperate therewith to be pushed endways into soil to remove weeds, and has at a free end thereof two barbs facing generally toward said stationary prong;
providing a supporting bar parallelly interposed between upper sections of said prongs; providing a stop pad;
providing said upper section of said adjustable prong (is provided) with two holes each having a size;
providing two horizontal partly threaded shafts each with a stop peg; coupling said shafts to said prongs wherein unthreaded ends of said shafts each have a diameter smaller than said size of each of said holes;
installing a spring between said stationary prong and said adjustable prong; and
providing four movable nuts around threaded arts of said two horizontal partly-threaded shafts.

9. A picking and weeding implement comprising:
a vertical straight stationary prong adapted to be pushed into soil endways;
an adjustable prong juxtapositional to said stationary prong in order to cooperate therewith to be pushed endways into the soil to remove weeds, and provided with means for engaging with a root of a weed in the soil;
a vertical supporting bar parallelly interposed between upper sections of said prongs;
two horizontal partly threaded means penetrating through said stationary and adjustable prongs and said supporting bar; and a spring fixed between the stationary prong and the adjustable prong so that the latter can automatically recover its vertical position after it is pressed against the former.

10. A picking and weeding implement comprising:
a stationary prong adapted to be pushed into soil endways;
an adjustable prong juxtapositional to said stationary prong in order to cooperate therewith to be pushed endways into the soil to remove weeds, and provided with means for engaging with a root of a weed in said soil;
two horizontal partly threaded means penetrating through said stationary and adjustable prongs;
a supporting bar passing therethrough said two horizontal partly threaded means for holding fast said adjustable prong; and
a spring fixed between the stationary prong and the adjustable prong so that the latter can automatically recover its vertical position after it is pressed against the former.

* * * * *